United States Patent
Park

(10) Patent No.: US 11,573,333 B2
(45) Date of Patent: Feb. 7, 2023

(54) ADVANCED DRIVER ASSISTANCE SYSTEM, VEHICLE HAVING THE SAME, AND METHOD OF CONTROLLING VEHICLE

(71) Applicant: HL KLEMOVE CORP., Incheon (KR)

(72) Inventor: HyunSoo Park, Seoul (KR)

(73) Assignee: HL KLEMOVE CORP., Incheon (KR)

( * ) Notice: Subject to any disclaimer, the term of this patent is extended or adjusted under 35 U.S.C. 154(b) by 294 days.

(21) Appl. No.: 16/904,226

(22) Filed: Jun. 17, 2020

(65) Prior Publication Data

US 2020/0393571 A1 Dec. 17, 2020

Related U.S. Application Data

(60) Provisional application No. 62/862,660, filed on Jun. 17, 2019.

(51) Int. Cl.
*G01S 19/47* (2010.01)
*G01S 19/39* (2010.01)
(Continued)

(52) U.S. Cl.
CPC ............. *G01S 19/47* (2013.01); *B60K 35/00* (2013.01); *B60W 30/00* (2013.01); *G01S 19/393* (2019.08);
(Continued)

(58) Field of Classification Search
CPC ...... G01S 19/47; G01S 19/393; G01S 19/396; G01S 19/49; B60K 35/00; B60K 2370/152; B60K 2370/164; B60W 30/00; B60W 2520/10; B60W 2520/14; B60W 2050/0075; B60W 2556/50; B60W 40/10; B60W 2050/0215; G07C 5/085;
(Continued)

(56) References Cited

U.S. PATENT DOCUMENTS

| 2010/0318292 A1* | 12/2010 | Kulik | G01S 19/49 |
| | | | 701/414 |
| 2014/0253375 A1* | 9/2014 | Rudow | G01S 19/49 |
| | | | 342/357.51 |

(Continued)

*Primary Examiner* — Richard M Camby
(74) *Attorney, Agent, or Firm* — Ladas & Parry, LLP

(57) ABSTRACT

A vehicle includes receiving signals from a plurality of satellites; obtaining position information based on the received signal; detecting a driving speed and yaw rate; obtaining dead reckoning information based on position information about a position of a vehicle recognized in a previous cycle and the received detection information; predicting the position information based on the obtained dead reckoning information; obtaining a value of Euclidean distance based on the position information about the position of the vehicle recognized in the previous cycle and the obtained position information; generating a first outlier filter based on the value of the Euclidean distance; obtaining a value of Mahalanobis distance based on the obtained position information and the predicted position information; generating a second outlier filter based on the value of the Mahalanobis distance; recognizing a current position of the vehicle by fusing information passing through the first outlier filter and information passing through the second outlier filter; and outputting information about the current position of the recognized vehicle as an image or a sound.

15 Claims, 12 Drawing Sheets

(51) Int. Cl.
*B60W 30/00* (2006.01)
*G07C 5/08* (2006.01)
*B60K 35/00* (2006.01)
*G06V 20/58* (2022.01)

(52) U.S. Cl.
CPC ............ *G01S 19/396* (2019.08); *G07C 5/085* (2013.01); *B60K 2370/152* (2019.05); *B60K 2370/164* (2019.05); *B60W 2520/10* (2013.01); *B60W 2520/14* (2013.01); *G06V 20/58* (2022.01)

(58) Field of Classification Search
CPC .... G07C 5/0891; G07C 5/0841; G06V 20/58; G06V 10/809; G06K 9/6292
See application file for complete search history.

(56) References Cited

U.S. PATENT DOCUMENTS

| | | | |
|---|---|---|---|
| 2014/0375493 A1* | 12/2014 | Weisenburger | G01S 19/47 342/357.3 |
| 2016/0069690 A1* | 3/2016 | Li | G01S 19/49 701/411 |
| 2017/0219359 A1* | 8/2017 | Elhoushi | G01C 21/206 |
| 2018/0150086 A1* | 5/2018 | Nobukawa | G01S 5/0263 |
| 2019/0138000 A1* | 5/2019 | Hammond | B60W 30/00 |

* cited by examiner

ADVANCED DRIVER ASSISTANCE SYSTEM, VEHICLE HAVING THE SAME, AND METHOD OF CONTROLLING VEHICLE

CROSS-REFERENCE TO RELATED APPLICATION(S)

This application is based on and claims priority under 35 U.S.C. § 119 to U.S. Patent Application No. 62/862,660, filed on Jun. 17, 2019 in the United States Intellectual Property Office, the disclosure of which is incorporated by reference in its entirety.

TECHNICAL FIELD

The disclosure relates to an advanced driver assistance system capable of improving an accuracy of position recognition of a vehicle, a vehicle having the same, and a method of controlling the vehicle.

BACKGROUND

In recent years, in order to prevent an accident caused by driver's carelessness and to safely drive to a destination, various advanced driver assistance systems (ADAS) have been developed to transmit driving information of a vehicle to the driver and to provide convenience to the driver.

The ADAS includes at least one of an ultrasonic sensor, an image sensor, a laser sensor, and a Light Detection And Ranging (LiDAR) sensor that can replace a human field of view, and may assist the driver in recognizing the road environment even when the driver cannot accurately recognize the road environment due to driver's carelessness, negligence, and visibility limitations by collecting information related to driving of the vehicle using the at least one sensor and guiding the driver while recognizing objects such as obstacles in the front.

With the development of position recognition technology of the vehicle, sensor technology, and antenna technology, the ADAS receives not only road guidance and traffic jam notification information, but also driving information, road condition information, and inter-vehicle message information of surrounding vehicles through a service of an intelligent transportation system (ITS), and controls autonomous driving of the vehicle based on the received information.

Here, the position recognition of the vehicle uses the global navigation satellite system (GNSS).

The GNSS is a system that provides information about a position, altitude, and speed of objects on a ground using satellites orbiting space. The GNSS may grasp precise position information with a resolution of 1 m or less, and is widely applied not only in military applications, but also in civilian fields such as position guidance, geodetic, emergency rescue, and communication of aircraft, ships, and vehicles.

The GNSS is composed of one or more GNSS satellites and a GNSS receiver capable of receiving signals, and a terrestrial monitoring station. The signals transmitted from the GNSS satellites are received by the GNSS receiver to determine a position through a distance from the GNSS satellites.

The position recognition using the satellite has a problem in that the accuracy of the vehicle is lost due to a loss of communication with the satellite when it is located in a shaded area such as a city or mountain covered with forest.

SUMMARY

An aspect of the disclosure is to provide an advanced driver assistance system capable of recognizing a position of a vehicle based on a wheel speed and a yaw rate, a vehicle having the same, and a method of controlling the vehicle.

An aspect of the disclosure is to provide an advanced driver assistance system capable of recognizing a position of a vehicle based on position information obtained by a global positioning system (GPS) and position information obtained by dead reckoning, a vehicle having the same, and a method of controlling the vehicle.

Additional aspects of the disclosure will be set forth in part in the description which follows and, in part, will be obvious from the description, or may be learned by practice of the disclosure.

In accordance with an aspect of the disclosure, an advanced driver assistance system includes a position receiver configured to receive signals from a plurality of satellites; a communicator configured to receive dynamics information of a vehicle; and a controller configured to obtain position information based on the signals received at the position receiver, to obtain dead reckoning information based on the received dynamic information, and to recognize a position of the vehicle based on the obtained dead reckoning information and the obtained position information.

The controller may be configured to obtain a value of Euclidean distance based on the position information about the position of the vehicle recognized in a previous cycle and the obtained position information, to predict the position information corresponding to the obtained dead reckoning information, to obtain a value of Mahalanobis distance based on the obtained position information and the predicted position information, and to determine outlier information based on the value of Euclidean distance and the value of the Mahalanobis distance.

When the obtained value of the Euclidean distance is greater than a value of a limit distance, the controller may be configured to determine the position information corresponding to the obtained value of the Euclidean distance as outlier information. When the obtained value of the Euclidean distance is less than or equal to the value of the limit distance, the controller may be configured to determine the position information corresponding to the obtained value of the Euclidean distance as reliability information.

The advanced driver assistance system may further include a storage configured to store a detection error of a detector and a signal reception error of the position receiver. The controller may be configured to set an outlier range based on the Euclidean distance, the limit distance, the stored detection error of the detector, and the stored signal reception error of the position receiver; and to determine whether the position information corresponding to the obtained value of the Euclidean distance is reliability information based on the set outlier range.

When the value of the Mahalanobis distance is greater than a value of a reference distance, the controller may be configured to determine the position information corresponding to the value of the Mahalanobis distance as outlier information. When the value of the Mahalanobis distance is less than or equal to the value of the reference distance, the controller may be configured to determine the position information corresponding to the value of the Mahalanobis distance as reliability information.

The controller may be configured to: when recognizing the position of the vehicle, predict the position information based on at least one of the position information about the position of the vehicle recognized in the previous cycle, the obtained dead reckoning information, and the obtained position information; generate an outlier filter based on the obtained dead reckoning information and the obtained position information; and recognize the position of the vehicle using information passing through the generated outlier filter among the predicted position information.

The advanced driver assistance system may further include a storage configured to store a detection error of a detector and a signal reception error of the position receiver. The controller may be configured to set an outlier range based on the position information corresponding to the obtained dead reckoning information, the position information on the position of the vehicle recognized in a previous cycle, the stored detection error of the detector, and the stored signal reception error of the position receiver.

The dynamics information may include driving speed information of the vehicle and yaw rate information of the vehicle. The controller may be configured to perform dead recording based on the driving speed information and the yaw rate information.

The controller may be configured to: predict the position information based on at least one of the position information about the position of the vehicle recognized in the previous cycle, the obtained dead reckoning information, and the obtained position information; and when the predicted position information is within the outlier range, perform an update of an extended Kalman filter based on the position information obtained by the dead recording and the position information obtained by the position receiver.

The controller may be configured to: predict the position information based on at least one of the position information about the position of the vehicle recognized in the previous cycle, the obtained dead reckoning information, and the obtained position information; and when the predicted position information is outside the outlier range, perform an update of an extended Kalman filter based on the position information obtained by the dead recording.

In accordance with another aspect of the disclosure, a method of controlling a vehicle includes a position receiver configured to receive signals from a plurality of satellites; a detector configured to detect a driving speed and yaw rate, and to output detection information corresponding to the detected driving speed and yaw rate; a controller configured to obtain position information based on the signal received at the position receiver, to obtain dead reckoning information based on position information about a position of a vehicle recognized in a previous cycle and the received detection information, to predict the position information based on the obtained dead reckoning information, to generate an outlier filter based on the predicted position information and the obtained position information, and to recognize a current position using information passing through the generated the outlier filter among the predicted position information and the obtained position information; and a display configured to output information about the recognized current position.

When generating the outlier filter, the controller may be configured to obtain a value of Euclidean distance based on the position information about the position of the vehicle recognized in a previous cycle and the obtained position information, and to generate the outlier filter based on the value of the Euclidean distance.

The controller may be configured to determine the position information such that the value of the Euclidean distance is less than or equal to a value of a limit distance using the generated outlier filter among the position information corresponding to the value of the Euclidean distance.

When generating the outlier filter, the controller may be configured to obtain a value of Mahalanobis distance based on the predicted position information and the obtained position information, and to generate the outlier filter based on the value of the Mahalanobis distance.

The controller may be configured to determine the position information such that the value of the Mahalanobis distance is less than or equal to a value of a reference distance using the generated outlier filter among the position information corresponding to the value of the Mahalanobis distance.

The controller may be configured to update information passing through the generated outlier filter using an extended Kalman filter.

In accordance with another aspect of the disclosure, a method of controlling a vehicle includes receiving signals from a plurality of satellites; obtaining position information based on the received signal; detecting a driving speed and yaw rate; obtaining dead reckoning information based on position information about a position of a vehicle recognized in a previous cycle and the received detection information; predicting the position information based on the obtained dead reckoning information; obtaining a value of Euclidean distance based on the position information about the position of the vehicle recognized in the previous cycle and the obtained position information; generating a first outlier filter based on the value of the Euclidean distance; obtaining a value of Mahalanobis distance based on the obtained position information and the predicted position information; generating a second outlier filter based on the value of the Mahalanobis distance; recognizing a current position of the vehicle by fusing information passing through the first outlier filter and information passing through the second outlier filter; and outputting information about the current position of the recognized vehicle as an image or a sound.

The recognizing of the current position of the vehicle may include updating the obtained position information using an extended Kalman filter.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
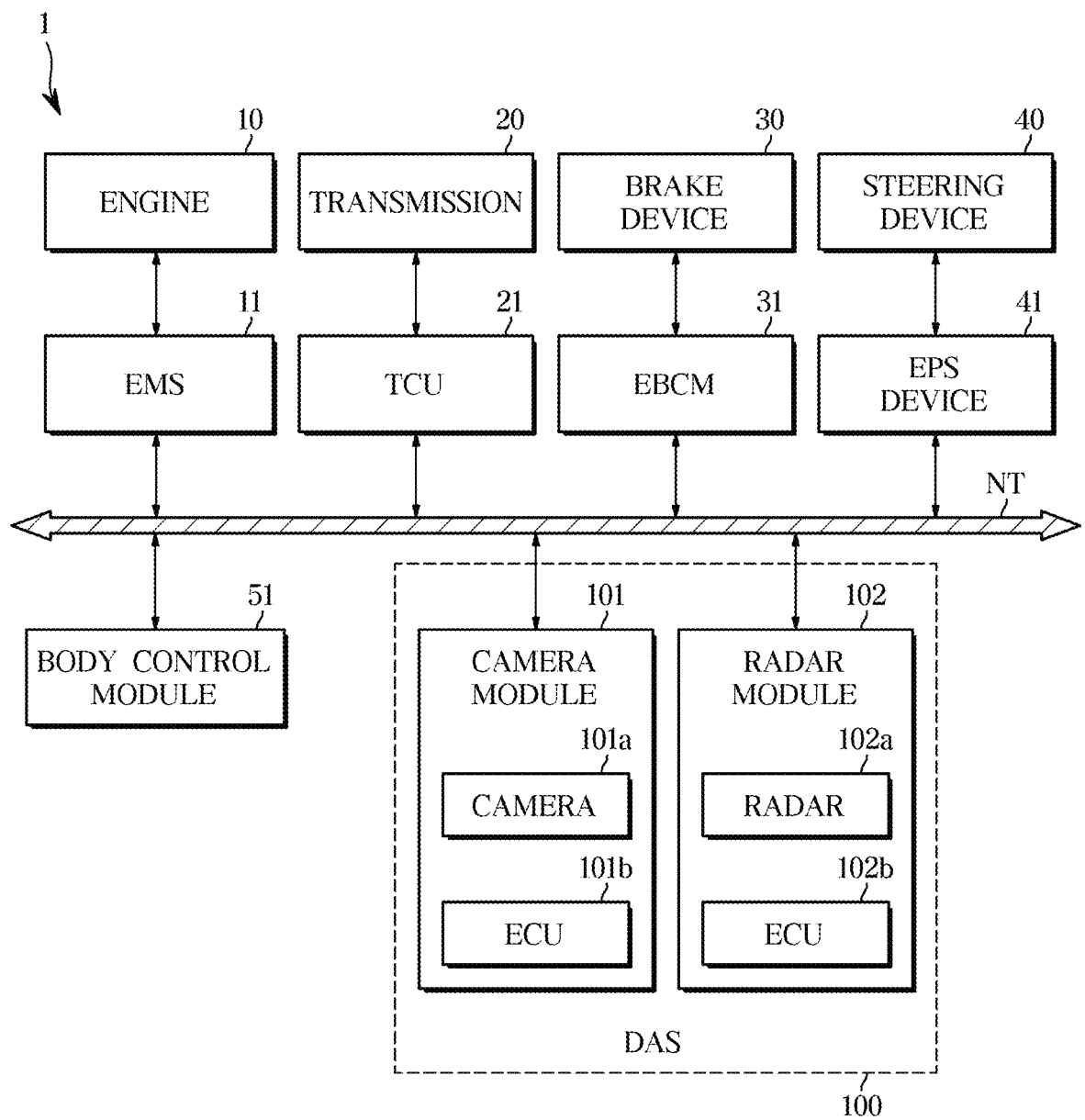
FIG. 1 is a block diagram illustrating a vehicle according to an embodiment.

Like reference numerals refer to like elements throughout the specification. Not all elements of the embodiments of the disclosure will be described, and the description of what are commonly known in the art or what overlap each other in the embodiments will be omitted.

The terms as used throughout the specification, such as "~ part," "~ module," "~ member," "~ block," etc., may be implemented in software and/or hardware, and a plurality of "~ parts," "~ modules," "~ members," or "~ blocks" may be implemented in a single element, or a single "~ part," "~ module," "~ member," or "~ block" may include a plurality of elements.

It will be further understood that the term "connect" and its derivatives refer both to direct and indirect connection, and the indirect connection includes a connection over a wireless communication network. The terms "include (or including)" and "comprise (or comprising)" are inclusive or open-ended and do not exclude additional, unrecited elements or method steps, unless otherwise mentioned. It will be further understood that the term "member" and its derivatives refer both to when a member is in contact with another member and when another member exists between the two members. It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise. Reference numerals used for method steps are merely used for convenience of explanation, but not to limit an order of the steps. Thus, unless the context clearly dictates otherwise, the written order may be practiced otherwise.

Hereinafter, operation principles and embodiments of the disclosure will be described with reference to accompanying drawings.

FIG. 1 is a block diagram illustrating a vehicle according to an embodiment.

A vehicle according to the embodiment may refer to a vehicle that performs a manual driving mode for driving in response to a driver's driving intent and an autonomous driving mode for autonomously driving to a destination.

The vehicle according to the embodiment may perform a navigation function for guiding a road based on position information in the manual driving mode, or an autonomous driving function for autonomous driving to the destination based on the position information in the autonomous driving mode.

The vehicle according to the embodiment may be an internal combustion engine vehicle or an eco-friendly vehicle.

In the embodiment, the internal combustion engine vehicle will be described as an example.

Referring to FIG. 1, a vehicle 1 may include an engine 10, a transmission 20, a braking device 30, and a steering device 40.

The engine 10 may include a cylinder and a piston, and may generate power for the vehicle 1 to drive.

The transmission 20 may include a plurality of gears, and may transmit power generated by the engine 10 to wheels.

The braking device 30 may decelerate or stop the vehicle 1 through friction with the wheels.

The steering device 40 may change a driving direction of the vehicle 1.

The vehicle 1 may include a plurality of electrical components.

For example, the vehicle 1 further includes an engine management system (EMS) 11, a transmission control unit (TCU) 21, and an electronic brake control module (EBCM) 31), an electronic power steering (EPS) 41, a body control module (BCM), and an advanced driver assistance system (ADAS).

The EMS 11 may control the engine 10 in response to acceleration intent of the driver through an accelerator pedal or a request of an advanced driver assistance system (ADAS) 100. For example, the EMS 11 may control torque of the engine 10.

The TCU 21 may control the transmission 20 in response to a shift command of the driver through a shift lever and/or a travelling velocity of the vehicle 1. For example, the TCU 21 may adjust the gear ratio from the engine 10 to the vehicle wheels.

The EBCM 31 may control the braking device 30 in response to a braking intent of a driver through a braking pedal and/or a slip of the vehicle wheels. For example, the EBCM 31 may temporarily release the braking of the vehicle wheel in response to a slip of the vehicle wheel sensed at a time of braking of the vehicle 1 (anti-lock braking systems, ABS).

The EBCM 31 may selectively release braking of the vehicle wheel in response to over-steering and/or under-steering sensed at a time of steering of the vehicle 1 (electronic stability control, ESC).

In addition, the EBCM 31 may temporarily brake the vehicle wheels in response to a slip of the vehicle wheel sensed at a time of driving of the vehicle 1 (traction control system, TCS).

The EPS 41 may assist the operation of the steering device 40 so that the driver easily manipulates the steering wheel, in response to a steering intent of the driver through the steering wheel. For example, the EPS 41 may assist the operation of the steering device 40 such that the steering force is reduced during low-velocity traveling or parking and is increased during high-velocity traveling.

The BCM 51 may control the operation of the electronic components that provide convenience to the driver or ensure the safety of the driver. For example, the BCM 51 may control a head lamp, a wiper, a cluster, a multifunction switch, a turn signal lamp, and the like.

The ADAS 100 may assist the driver in manipulating (driving, braking, steering) the vehicle 1. For example, the ADAS 100 may detect a surrounding environment (e.g., another vehicle, a pedestrian, a cyclist, a lane, a road sign, etc.) around the vehicle 1 and control the driving and/or braking and/or steering of the vehicle 1 in response to the sensed surrounding environment.

The ADAS 100 may provide the driver with various functions. For example, the DAS 60 may provide a lane departure warning (LDW), a lane keeping assist (LKA), a high beam assist (HBA), an autonomous emergency braking (AEB), a traffic sign recognition (TSR), a smart cruise control (SCC), a blind spot detection (BSD), and the like.

The ADAS 100 may also perform a navigation function that recognizes the position of the vehicle and guides the road based on information about the recognized position.

The ADAS 100 may recognizes the road environment by itself, determines obstacles and driving conditions, and controls the vehicle's driving according to the planned driving route based on the position information while avoiding obstacles to autonomously drive to the destination. It may include control functions.

The ADAS 100 may include an autonomous driving control function that allows the vehicle to recognize a road environment by itself, determine the obstacle and a driving situation, and control the driving of the vehicle according to a planned driving path based on the position information while avoiding an obstacle such that the vehicle automatically drives to the destination.

The ADAS 100 may include a camera module 101 for obtaining image data around the vehicle 1 and a radar module 102 for obtaining obstacle data around the vehicle 1.

The camera module 101 may include a camera 101a and an electronic control unit (ECU) 101b, and may photograph the front of the vehicle 1 and recognize other vehicles, pedestrians, cyclists, lanes, road signs, and the like.

The radar module 102 may include a radar 102a and an electronic control unit (ECU) 102b, and may obtain relative positions and relative velocities of obstacles (e.g., other vehicles, pedestrians, cyclists, and the like) around the vehicle 1.

The above described electronic components may communicate with each other through vehicle communication network (NT). For example, the electrical components may exchange data therebetween through Ethernet, media oriented systems transport (MOST), Flexray, controller area network (CAN), local interconnect network (LIN), and the like. Here, the data may include vehicle driving data related to vehicle driving information.

The ADAS 100 may transmit a driving control signal, a braking signal, and a steering signal to the EMS 11, the EBCM 31, and the EPS 41, respectively, through the NT.

Figure 2:
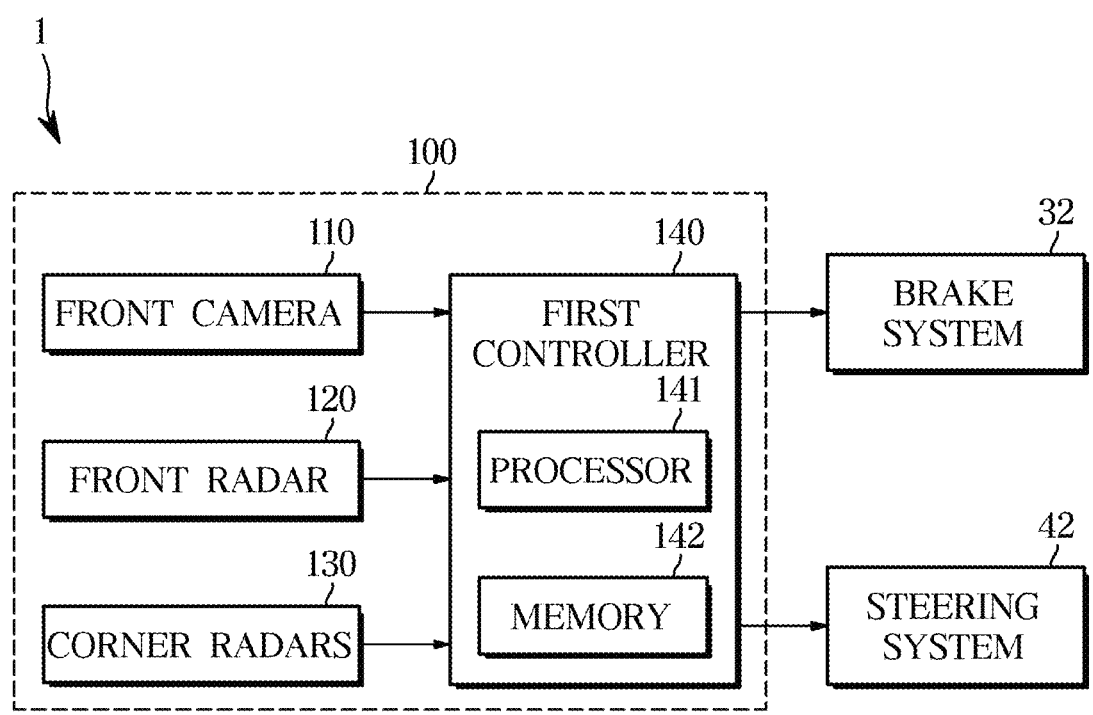
FIG. 2 is a block diagram illustrating an advanced driver assistance system (ADAS) provided in a vehicle according to an embodiment.
Figure 3:
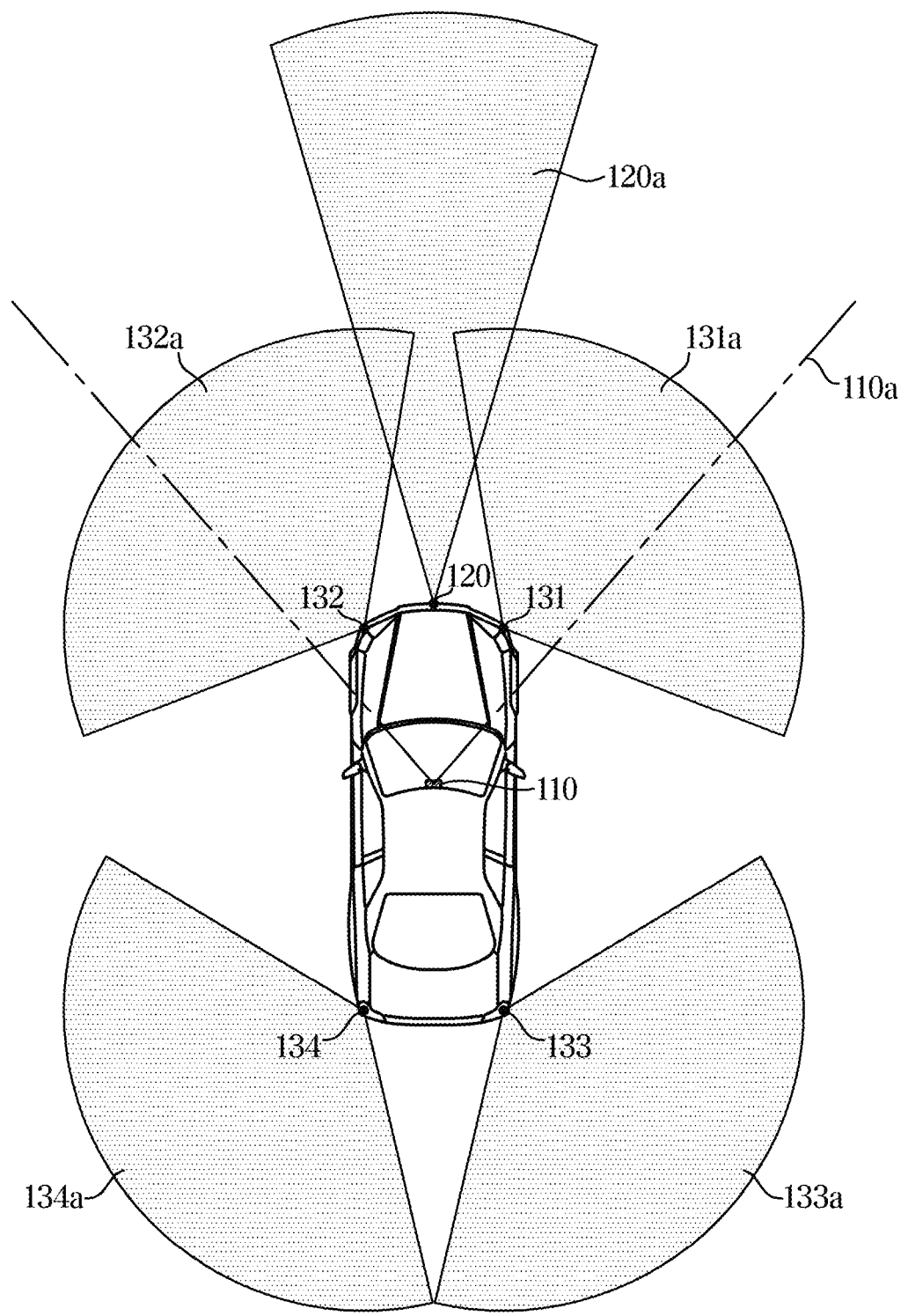
FIG. 3 is a view illustrating an example of a detection area of a camera and a radar included in an ADAS of a vehicle according to an embodiment.

FIG. 2 is a block diagram illustrating an ADAS provided in a vehicle according to an embodiment, and FIG. 3 is a view illustrating an example of a detection area of a camera and a radar included in an ADAS of a vehicle according to an embodiment.

The ADAS according to the embodiment may perform a collision avoidance function for preventing a collision with the obstacle when changing a lane. That is, the ADAS according to the embodiment may represent a collision avoidance apparatus.

The ADAS of the embodiment may be a lane change assistance device that outputs information about a lane change possibility or controls lane change based on the lane change possibility.

Referring to FIG. 2, the vehicle 1 may include a braking system 32, a steering system 42, and the ADAS 100.

The braking system 32 according to the embodiment may include the EBCM 31 (see FIG. 1) and the braking device 30 (see FIG. 1) described in conjunction with FIG. 1, and the steering system 42 may include the EPS 41 (see FIG. 1) and the steering device 40 (see FIG. 1).

The ADAS 100 according to the embodiment may include a front camera 110 as a camera of the camera module 101, and may include a plurality of corner radars 130 (131, 132, 133, and 134) as the radar of the radar module 102.

Referring to FIG. 3, the ADAS 100 may include the front camera 110 configured to have a field of view 110a directed to the front of the vehicle 1, a front radar 120, and the plurality of corner radars 130.

The front camera 110 may be installed on a front windshield of the vehicle 1.

The front camera 110 may image the front of the vehicle 1 and acquire image data regarding the front of the vehicle 1. The image data regarding the front of the vehicle 1 may include position information of at least one of another vehicle, a pedestrian, a cyclist, a lane, a curb, a guard rail, a roadside tree, a street lamp, or the like existing in front of the vehicle 1.

The front camera 110 may include a plurality of lenses and an image sensor. The image sensor may include a plurality of photodiodes for converting light into electrical signals, and the plurality of photodiodes may be arranged in a two-dimensional matrix.

The front camera 110 may be electrically connected to a first controller 140. For example, the front camera 110 may be connected to the first controller 140 through a vehicle communication network NT, through a hard wire, or through a printed circuit board (PCB).

The front camera 110 may transmit the image data of the front of the vehicle 1 to the first controller 140.

The front radar 120 may have a field of sensing 120a directed to the front of the vehicle 1. The front radar 120 may be installed, for example, on a grille or a bumper of the vehicle 1.

The front radar 120 may include a transmission antenna (or a transmission antenna array) that radiates transmission radio waves to the front of the vehicle 1 and a reception antenna (or a reception antenna array) that receives reflection radio waves reflected from an obstacle.

The front radar 120 may acquire front radar data from the transmission radio waves transmitted by the transmission antenna and the reflection radio waves received by the reception antenna.

Front radar data may include position information and velocity information regarding an obstacle, such as another vehicle, a pedestrian, or a cyclist existing in front of the vehicle 1.

The front radar 120 may calculate the relative distance to the obstacle based on the phase difference (or time difference) between the transmission radio waves and the reflection radio waves, and calculate the relative velocity of the object based on the frequency difference between the transmission radio waves and the reflected radio waves.

The front radar 120 may be connected to the first controller 140 through a vehicle communication network NT, a hard wire, or a printed circuit board. The front radar 120 may transmit the front radar data to the first controller 140.

The plurality of corner radars 130 includes a first corner radar 131 installed on the front right side of the vehicle 1, a second corner radar 132 installed on the front left side of the vehicle 1, a third corner radar 133 installed on the rear right side of the vehicle 1, and a fourth corner radar 134 installed on the rear left side of the vehicle 1.

The first corner radar 131 may have a field of sensing 131a directed to the front right side of the vehicle 1. The first corner radar 131 may be installed on the right side of a front bumper of the vehicle 1.

The second corner radar 132 may have a field of sensing 132a directed to the front left side of the vehicle 1, and may be installed on the left side of the front bumper of the vehicle 1.

The third corner radar 133 may have a field of sensing 133a directed to the rear right side of the vehicle 1 and may be installed on the right side of a rear bumper of the vehicle 1.

The fourth corner radar 134 may have a field of sensing 134a directed to the rear left side of the vehicle 1 and may be installed on the left side of the rear bumper of the vehicle 1.

Each of the first, second, third and fourth corner radars 131, 132, 133, and 134 may include a transmission antenna and a reception antenna.

The first, second, third, and fourth corner radars 131, 132, 133 and 134 acquire first corner radar data, second corner radar data, third corner radar data, and fourth corner radar data, respectively.

The first corner radar data may include distance information and velocity information regarding another vehicle, a pedestrian or a cyclist (hereinafter, referred to as the obstacle) existing on the front right side of the vehicle 1.

The second corner radar data may include distance information and velocity information regarding an obstacle existing on the front left side of the vehicle 1.

The third and fourth corner radar data may respectively include distance and velocity information regarding an obstacle existing on the rear right side of the vehicle 1 and distance and velocity information regarding an object located on the rear left side of the vehicle 1, respectively.

Each of the first, second, third, and fourth corner radars 131, 132, 133 and 134 may be connected to the first controller 140, for example, through the vehicle communication network NT, a hard wire, or a printed circuit board. The first, second, third, and fourth corner radars 131, 132, 133, and 134 may respectively transmit the first corner radar data, the second corner radar data, the third corner radar data, and the fourth corner radar data to the first controller 140.

The first controller 140 may include the ECU (101b in FIG. 1) of the camera module (101 in FIG. 1) and/or the ECU (102b in FIG. 1) of the radar module (102 in FIG. 1), and/or an integrated ECU.

The first controller 140 includes a processor 141 and a memory 142.

The processor 141 may process the front image data of the front camera 110, the front radar data of the front radar 120, and the corner radar data of the plurality of corner radars 130, and generate a braking signal and a steering signal for controlling the braking system 32 and the steering system 42.

For example, the processor 141 may include an image signal processor for processing the front image data of the front camera 110 and/or a digital signal processor for processing radar data of the radars 120 and 130 and/or a micro control unit (MCU) for generating a braking signal and/or a steering signal.

The processor 141 may detect obstacles (e.g., another vehicle, a pedestrian, a cyclist, a curb, a guard rail, a roadside tree, a street lamp, and the like) in front of the vehicle 1 based on the front image data of the front camera 110 and the front radar data of the radar 120.

In detail, the processor 141 may acquire position information (distance and direction) and velocity information (relative velocity) of the obstacles in front of the vehicle 1 based on the front radar data of the front radar 120. The processor 141 may acquire position information (direction) and type information (for example, whether the obstacle is another vehicle, a pedestrian, a cyclist, a curb, a guard rail, a roadside tree, a street lamp, or the like) of the obstacle existing in front of the vehicle 1 based on the front image data of the front camera 110.

In addition, the processor 141 may match the obstacles detected by the front image data with the obstacles detected by the front radar data, and acquire the type information, the position information, and the velocity information of the obstacles in front of the vehicle 1 based on a result of the matching.

The processor 141 may generate a braking signal and a steering signal based on the type information, the position information, and the velocity information of the front obstacles.

For example, the processor 141 calculates a time to collision (TTC) between the vehicle 1 and the front obstacle based on the position information (relative distance) and the velocity information (relative velocity) of the front objects, and warns the driver of a collision, transmits a braking signal to the braking system 32, or transmits a steering signal to the steering system 42 based on a result of comparing the TTC with a predetermined reference time.

In response to the TTC less than a predetermined first reference time, the processor 141 may allow an alert to be output via audio and/or display.

In response to the TTC less than a predetermined second reference time, the processor 141 may transmit a preliminary-braking signal to the braking system 32.

In response to the TTC less than a predetermined third reference time, the processor 141 may transmit an emergency braking signal to the braking system 32. In this case, the second reference time is shorter than the first reference time, and the third reference time is shorter than the second reference time.

The processor 141 may transmit a steering signal to the steering system 42 based on the direction information of the position information of the front obstacles.

As another example, the processor 141 may calculate a distance to collision (DTC) based on the velocity information (e.g., relative velocity) of front objects, and warn the driver of a collision or transmit a braking signal to the braking system 32 based on a result of comparing the DTC with distances to the front objects.

The processor 141 may acquire position information (distance and direction) and velocity information (relative velocity) of the obstacles on the sides of the vehicle 1 (front right, front left, rear right, and rear left) based on corner radar data of the plurality of corner radars 130.

The memory 142 may store programs and/or data for processing image data by the processor 141, programs and/or data for processing radar data by the processor 141, and programs and/or data for generating a braking signal and/or a steering signal by the processor 141.

The memory 142 may temporarily memorize the image data received from the front camera 110 and/or the radar data received from the radars 120 and 130, and may temporarily memorize a result of processing the image data and/or the radar data of the processor 141.

The memory 142 may not only include a volatile memory, such as an S-RAM, a D-RAM, and the like, but also include a non-volatile memory, such as a flash memory, a read only memory (ROM), an erasable programmable read only memory (EPROM), and the like.

Figure 4:
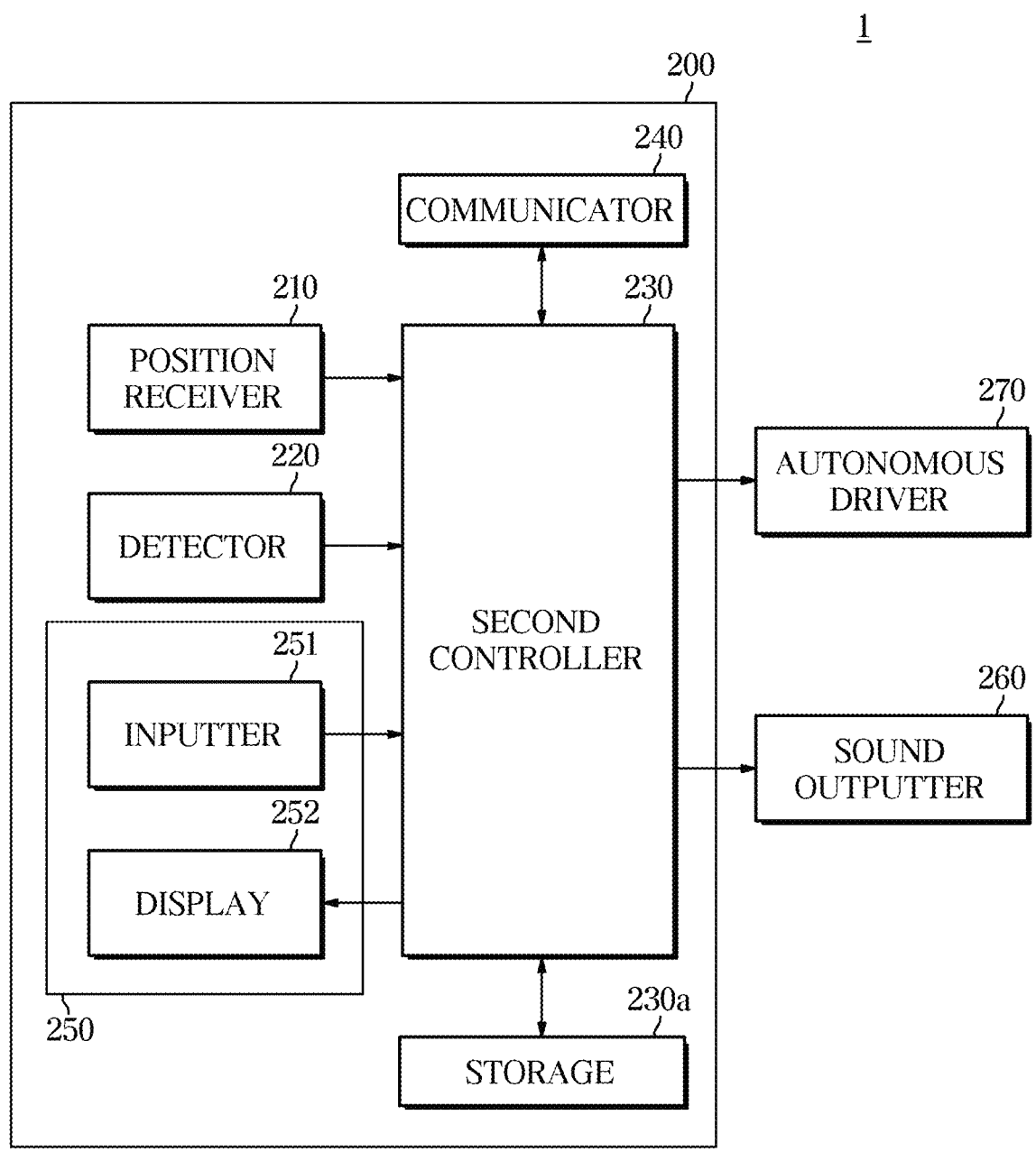
FIG. 4 is a control block diagram illustrating a position recognition apparatus of an ADAS provided in a vehicle according to an embodiment.

FIG. 4 is a control block diagram illustrating a position recognition apparatus of an ADAS provided in a vehicle according to an embodiment.

A position recognition apparatus 200 may include a position receiver 210, a detector 220, a second controller 230, a storage 230a, and a communicator 240. The vehicle 1 may further include a user interface 250, a sound outputter 260, and an autonomous driver 270.

The position receiver 210 may receive signals transmitted from a plurality of satellites, obtain the position information about the current position of the vehicle based on the received signals, and transmit the obtained current position information to the second controller 230. The position receiver 210 may include a global positioning system (GPS) receiver.

Here, the GPS receiver may include an antenna for receiving the signals from the plurality of GPS satellites, software for obtaining a vehicle position using a distance and time information corresponding to the position signals from the plurality of GPS satellites, and an outputter for outputting the position information of the obtained vehicle.

The detector 220 may detect dynamics information of the vehicle 1. Here, dynamic information of the vehicle 1 may include driving information and motion information of the vehicle 1. That is, the detector 220 may include a speed detector for detecting a driving speed of the vehicle 1 and a yaw rate detector for detecting a yaw rate of the vehicle 1.

Here, the driving speed of the vehicle 1 may be the speed of the vehicle body.

The speed detector may be a wheel speed sensor provided in front, rear, left, and right wheels or an acceleration sensor that detects acceleration of the vehicle.

The speed detector may include a plurality of wheel speed sensors that output detection information (that is, wheel speed information) corresponding to the rotational speed of the wheels provided on the front, rear, left, and right wheels of the vehicle 1.

The speed detector may also include the acceleration sensor that outputs detection information (i.e., acceleration information) corresponding to the acceleration of the vehicle 1.

The speed detector may also include both the plurality of wheel speed sensors and the acceleration sensor.

The yaw rate detector may electronically detect a yaw moment of the vehicle 1 as a plate fork inside the yaw rate detector causes a vibration change when the vehicle 1 rotates about a vertical axis, that is, rotates around a Z axis direction. A crystal element inside the yaw rate detector may rotate by a movement of the vehicle 1. At this time, the yaw rate detector may output a voltage generated by rotation of the crystal element.

The detector 220 may be an inertial measurement unit (IMU) that measures a speed, direction, gravity, and acceleration of the vehicle 1. Here, the IMU may include a gyroscope, accelerometer, and geomagnetic sensor that measures free movement in a three-dimensional space.

The second controller 230 may obtain dead reckoning information based on the dynamic information of the vehicle 1 detected by the detector 220, fuse the obtained dead reckoning information with the position information received by the position receiver 210, and recognize the position of the vehicle 1 based on the fused information. The configuration of the second controller 230 will be described later with reference to FIG. 5.

Here, the dynamic information of the vehicle 1 may include driving speed information and yaw rate information of the vehicle 1.

The second controller 230 may obtain the driving speed of the vehicle 1 based on the speed information of the plurality of wheels detected by the plurality of wheel speed sensors, or obtain the driving speed of the vehicle 1 based on the acceleration information detected by the acceleration sensor, or obtain the driving speed of the vehicle 1 based on the speed information of the plurality of wheels detected by the plurality of wheel speed sensors and the acceleration information detected by the acceleration sensor.

Figure 5:
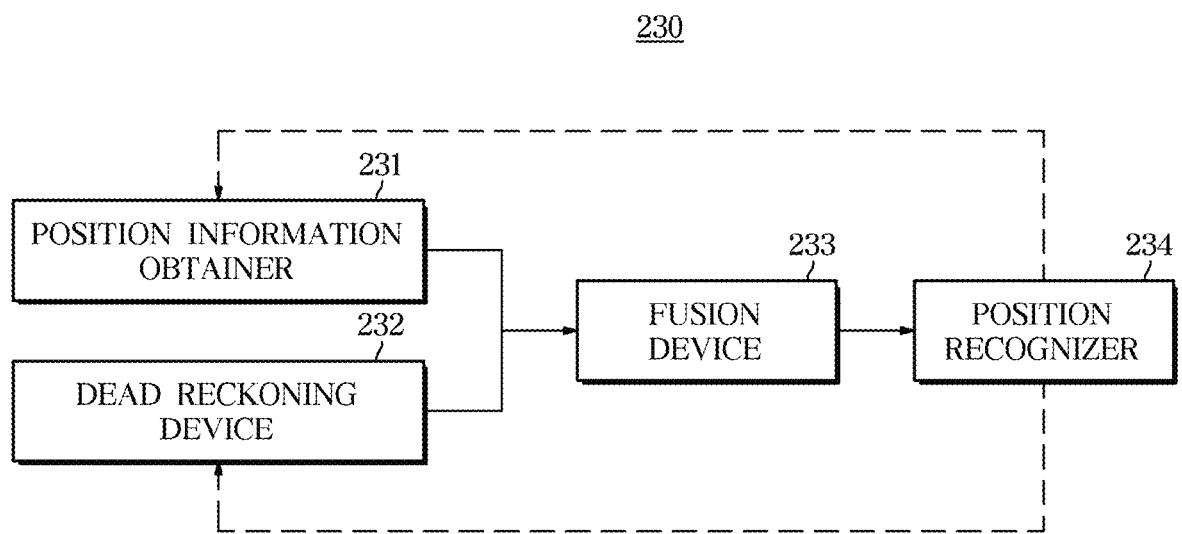
FIG. 5 is a block diagram illustrating a second controller according to an embodiment.

Referring to FIG. 5, the second controller 230 may include a position information obtainer 231, a dead reckoning device 232, a fusion device 233, and a position recognizer 234.

The position information obtainer 231 may obtain coordinate information of the vehicle 1 from signals of the plurality of satellites received by the position receiver 210.

More particularly, the position information obtainer 231 may obtain longitude information and latitude information about the position of the vehicle 1 from the signals of the plurality of satellites, obtain map information corresponding to the obtained longitude information and latitude information, and obtain coordinate information for vertical and horizontal of the vehicle 1 based on the obtained road information in the map information.

The position information obtainer 231 is also capable of obtaining time information obtained from the coordinate information.

The dead reckoning device 232 may obtain information (i.e., trajectory information) about driving trajectory of the vehicle 1 based on the vehicle dynamics information (vehicle speed (v), yaw rate ($\dot{\psi}$))) detected by the detector 220 based on the position information received by the position receiver 210, and obtain the current position information based on the position information received by the position receiver 210 and the obtained trajectory information. Here, obtaining the current position information may include obtaining the current position information predicted by the obtained trajectory information.

The vehicle dynamics information may include driving speed information and yaw rate information of the vehicle 1.

The position information received at the position receiver 210 may be position information received at a first time point, and the dynamics information may be information detected at a second time point that has elapsed a predetermined time from the first time point. The first time point may be a time point of a previous cycle.

That is, the dead reckoning device 232 may periodically obtain the information (i.e., trajectory information) about the driving trajectory of the vehicle 1 based on the vehicle dynamics information (vehicle speed (v), yaw rate ($\dot{\psi}$)) detected by the detector 220, and may obtain the current position information based on the obtained trajectory information and the position information recognized in the previous cycle.

The dead reckoning device 232 may continuously obtain the current position information based on the vehicle dynamics information (vehicle speed (v), yaw rate ($\dot{\psi}$)) detected by the detector 220 when the position information is not received by the position receiver 210. Here, continuously obtaining the current position information may include obtaining continuously predicted current position information.

Figure 6A:
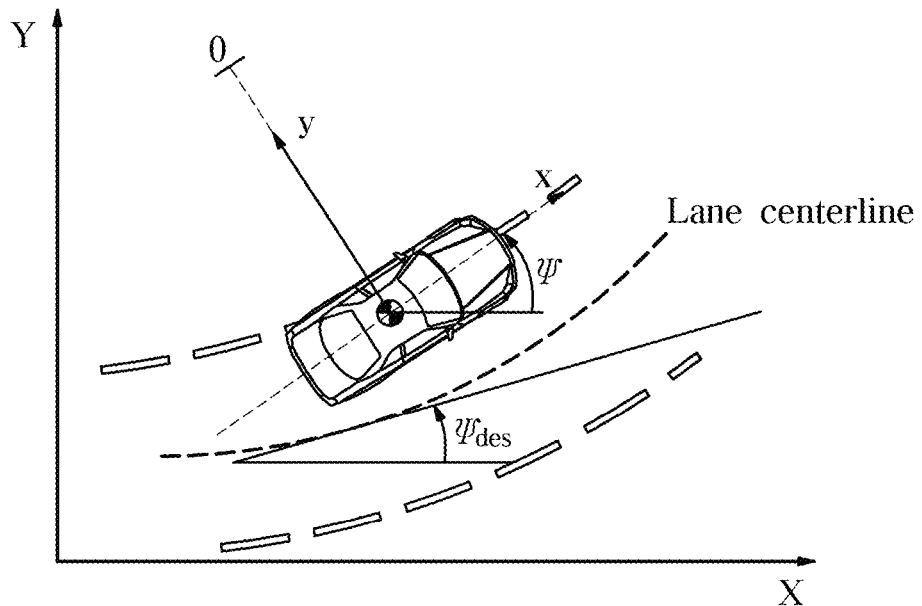
FIG. 6A shows an example that a dead reckoning device obtains information about a driving trajectory of a vehicle using a kinematic model according to an embodiment.

Referring to FIG. 6A, the dead reckoning device 232 may obtain information about the driving trajectory of the vehicle 1 using a kinematic model.

The information about the driving trajectory may be expressed by the following equation.

$$\begin{bmatrix} x_t \\ y_t \\ \psi_t \end{bmatrix} = \begin{bmatrix} x_{t-1} + \frac{2v_{t-1}}{\dot{\psi}_{t-1}} \cdot \sin\left(\frac{\Delta t \cdot \dot{\psi}_{t-1}}{2}\right) \cdot \cos\left(\psi_{t-1} + \frac{\Delta t \cdot \dot{\psi}_{t-1}}{2}\right) \\ y_{t-1} + \frac{2v_{t-1}}{\dot{\psi}_{t-1}} \cdot \sin\left(\frac{\Delta t \cdot \dot{\psi}_{t-1}}{2}\right) \cdot \sin\left(\psi_{t-1} + \frac{\Delta t \cdot \dot{\psi}_{t-1}}{2}\right) \\ \psi_{t-1} + \Delta t \cdot \dot{\psi}_{t-1} \end{bmatrix}$$

Figure 6B:
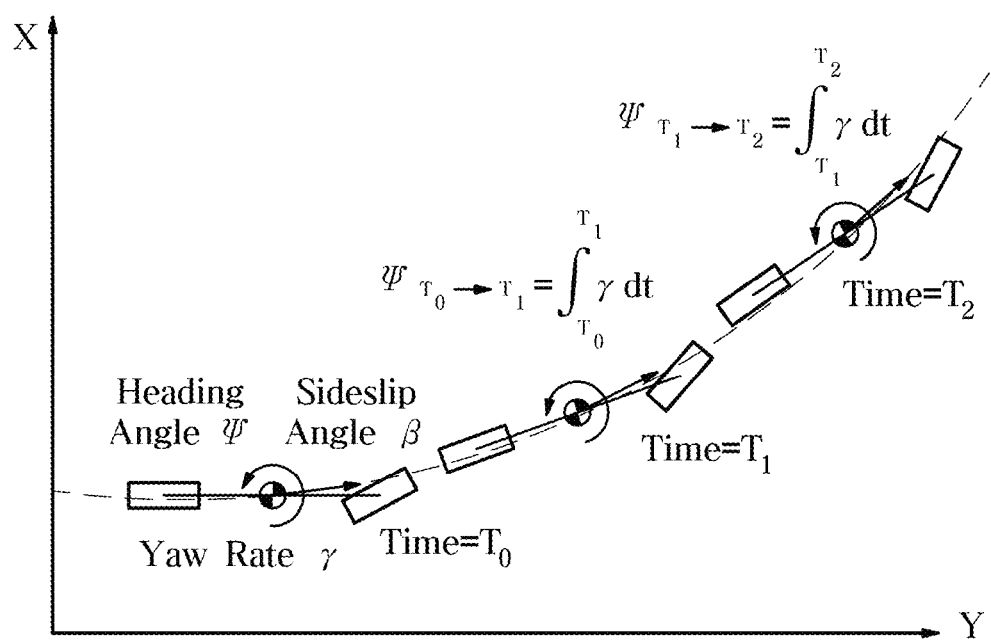
FIG. 6B shows an example that a dead reckoning device continuously obtains current position information using a dead reckoning algorithm according to an embodiment.

Referring to FIG. 6B, the dead reckoning device 232 may continuously obtain the current position information using a dead reckoning algorithm.

Here, the dead reckoning algorithm may be an algorithm for obtaining the position information of the vehicle 1 using integration.

When the at least one satellite signal is not received by the position receiver 210, the fusion device 233 may set a range capable of driving for one cycle based on the position information of the vehicle 1 recognized in the previous cycle.

Figure 7A:
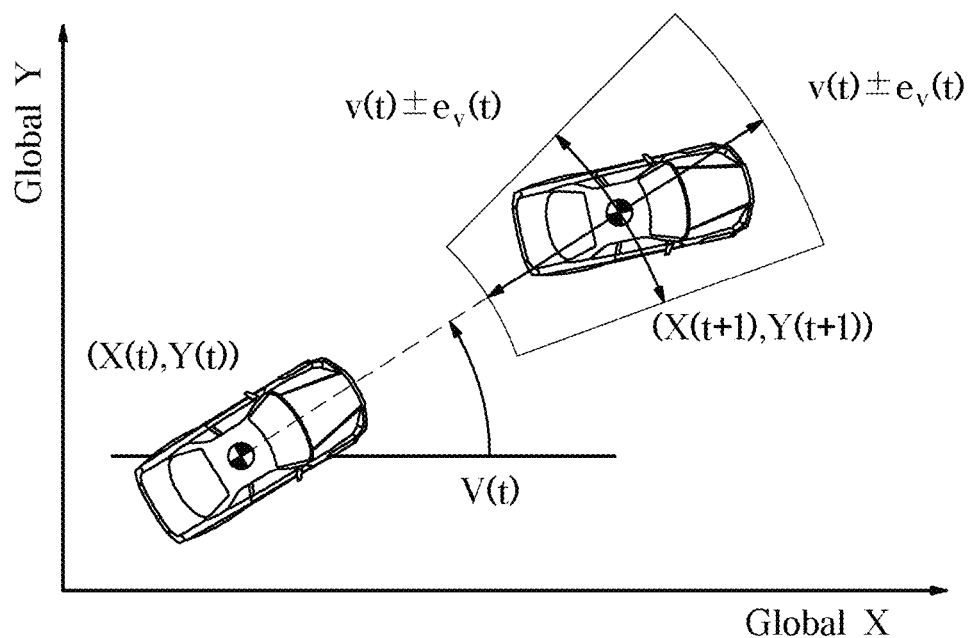
FIG. 7A illustrates an exemplary embodiment that a fusion device predicts a current position of a vehicle.

Referring to FIG. 7A, the fusion device 233 may predict the current position of the vehicle 1 based on the position information of the vehicle 1, the driving speed information of the vehicle 1, and the yaw rate information recognized in the previous cycle and set a range that can be driven for one cycle (sampling time) based on the position information for the predicted current position.

Here, the range that can be driven is a range for determining the reliability of the GPS signal, and may be an outlier range for determining outlier information.

Figure 7B:
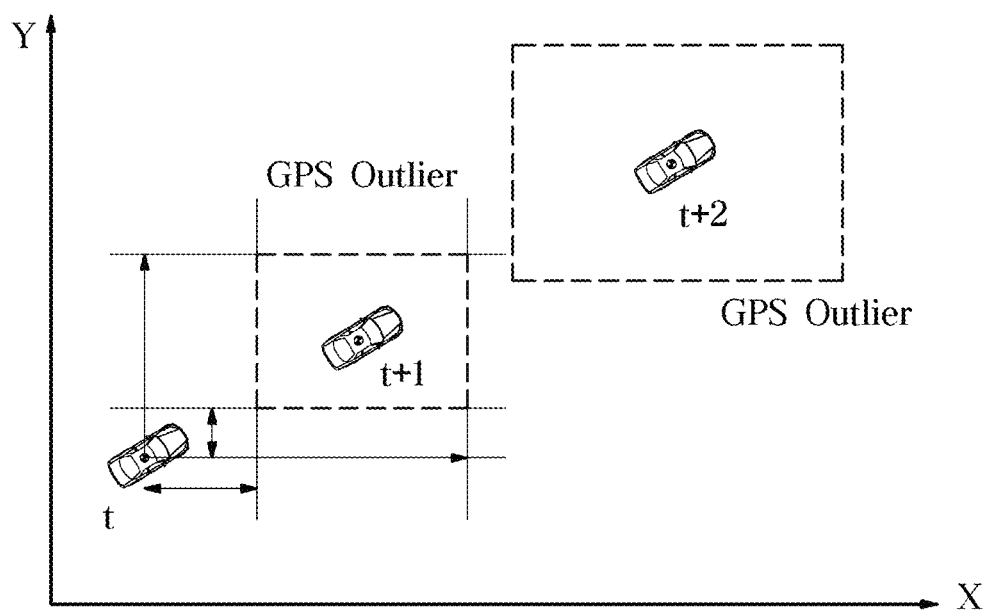
FIG. 7B shows an exemplary embodiment that a fusion device sets an outlier range based on position information, driving speed information and yaw rate information of a vehicle recognized in the previous cycle, information about errors in a wheel speed sensor, an inertial measurement unit (IMU) and GPS receiver stored in storage.

Referring to FIG. 7B, when setting the outlier range, the position information, the fusion device 233 may set the outlier range based on the position information, the driving speed information and yaw rate information of the vehicle 1 recognized in the previous cycle, information about errors (that is, error information of each sensor) in the wheel speed sensor, the IMU and GPS receiver stored in the storage 230a.

The fusion device 233 may determine the reliability of the GPS signal based on the set outlier range.

The fusion device 233 may recognize the position of the vehicle 1 by performing an update of an extended Kalman filter based on the position information obtained by the dead recording information and the position information received from the position receiver 210 when it is determined that the reliability of the signal received by the position receiver 210 (that is, the position information received by the position receiver) is greater than a reference reliability and is reliability information.

The fusion device 233 may recognize the position of the vehicle 1 by performing the update of the extended Kalman filter using only the position information obtained by the dead recording information when it is determined that the reliability of the signal received by the position receiver 210 (that is, the position information received by the position receiver) is less than the reference reliability and is outlier information.

Here, the recognizing the position of the vehicle 1 by performing the update of the extended Kalman filter may include correcting the position information obtained according to the dead recording information and the position information received by the position receiver 210 and recognizing the corrected position information.

The fusion device 233 may obtain information about a physical distance (Euclidean Distance) and a probabilistic distance (Mahalanobis distance), respectively, based on the position information received by the position receiver 210, the position information recognized by the position recognizer 234, and the obtained dead reckoning information, generate a first outlier filter based on the obtained physical distance information, and generate a second outlier filter based on the information about the probabilistic distance.

The fusion device 233 may output information about the Euclidean distance determined as reliability information by the first outlier filter (that is, the value of the Euclidean distance), and may output information about the Mahalanobis distance determined as reliability information by the second outlier filter.

The fusion device 233 may also set the outlier range based on the information about the physical distance (Euclidean Distance).

More particularly, the fusion device 233 may obtain the physical distance (Euclidean Distance) based on position information (DisGPS) received at the position receiver 210 and position information (Disveh) obtained in the previous cycle.

Here, the physical distance (Euclidean Distance) may be the distance between two points in N-dimensional space.

Figure 8:
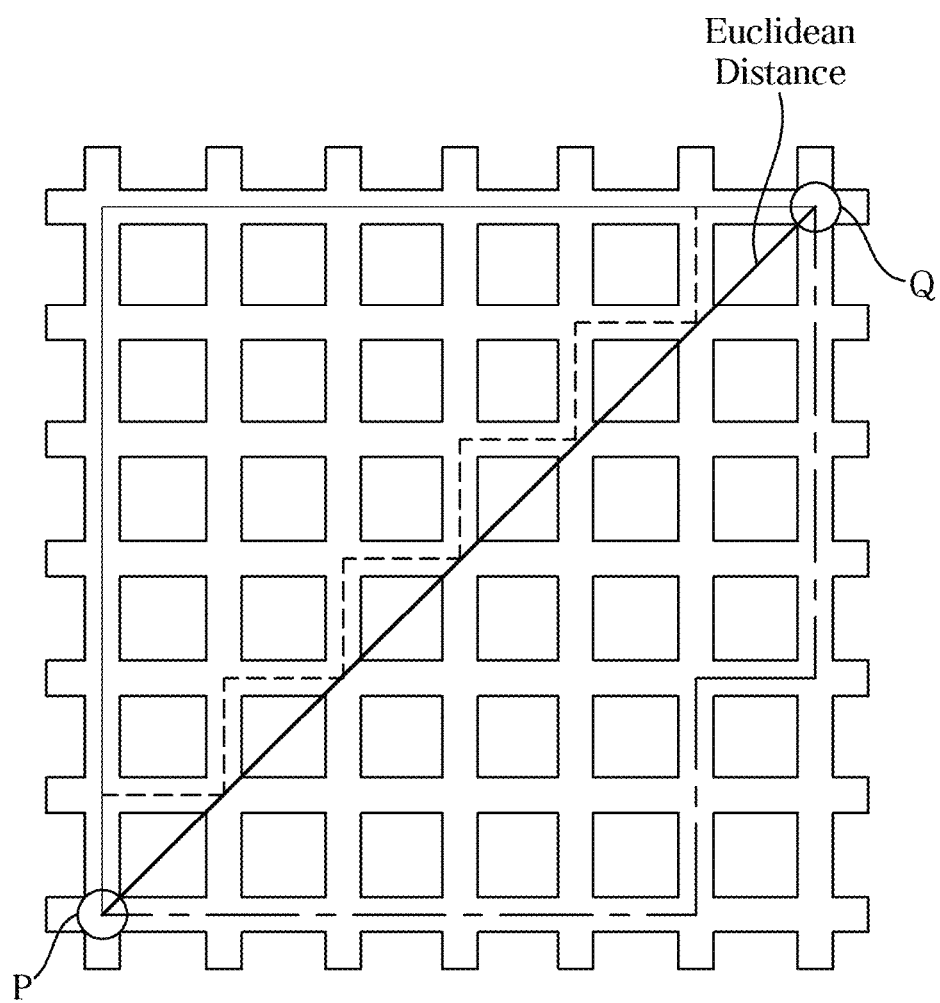
FIG. 8 illustrates various exemplary distances according to an embodiment.

Referring to FIG. 8, the physical distance may be the same as a straight line distance measured by a ruler, and may be expressed by the following equation.

$$Dis_{euc}(p,q) = \sqrt{(p_1-q_1)^2 + (p_2-q_2)^2 + \ldots + (p_n-q_n)^2} = \sqrt{\sum_{i=1}^{M}(p_i-p_i)^2}$$

In addition, there are physical limitations on a distance the vehicle 1 can drive for a period (or sampling time). Here, the distance that can be driven for one cycle (or sampling time) may be set in advance. The distance that can drive for one cycle (or sampling time) may be defined as a limit distance.

The fusion device 233 may set the Outlier range based on information about the Euclidean distance and the limit distance, detection error information of the wheel speed sensor and the IMU stored in the storage 230a, and information about a signal reception error of the position receiver.

The fusion device 233 may determine the outlier information when the obtained Euclidean distance is greater than the limit distance, and may determine the reliability information (Reliable) when the obtained Euclidean distance is less than the limit distance.

$$Dis_{veh}(t) = v(t-1) \cdot dt$$

$$Dis_{GPS}(t) = \sqrt{(x_{GPS}(t) - x_{fusion}(t-1))^2 + (y_{GPS}(t) - y_{fusion}(t-1))^2}$$

ε: Error Compensation Constant
When it is $$\left[\frac{1}{\varepsilon} \cdot Dis_{veh}(t) \le Dis_{GPS}(t) \le \varepsilon \cdot Dis_{veh}(t)(\varepsilon > 1)\right],$$

the fusion device 233 may be determined $$\left[\frac{1}{\varepsilon} \cdot Dis_{veh}(t) \le Dis_{GPS}(t) \le \varepsilon \cdot Dis_{veh}(t)\ (\varepsilon > 1)\right],$$

the fusion device 233 may be determined as the outlier information (Outlier).

The fusion device 233 may determine the reliability information when the obtained Euclidean distance is within the outlier range, and determine the outlier information when the obtained Euclidean distance is outside the outlier range.

The fusion device 233 may set the outlier range based on the position information corresponding to the obtained dead reckoning information, the position information about the position of the vehicle 1 recognized in the previous cycle, the detection error of the stored detector, and the signal reception error of the stored position receiver, and may also determine whether the signal received by the position receiver is the reliability information or the outlier information based on the set outlier range.

The position information corresponding to the obtained dead reckoning information may include a value of a drivable distance.

The fusion device 233 may obtain the probabilistic distance (Mahalanobis distance) based on the position information (DisGPS) and the dead recording information received by the position receiver 210.

Figure 9:
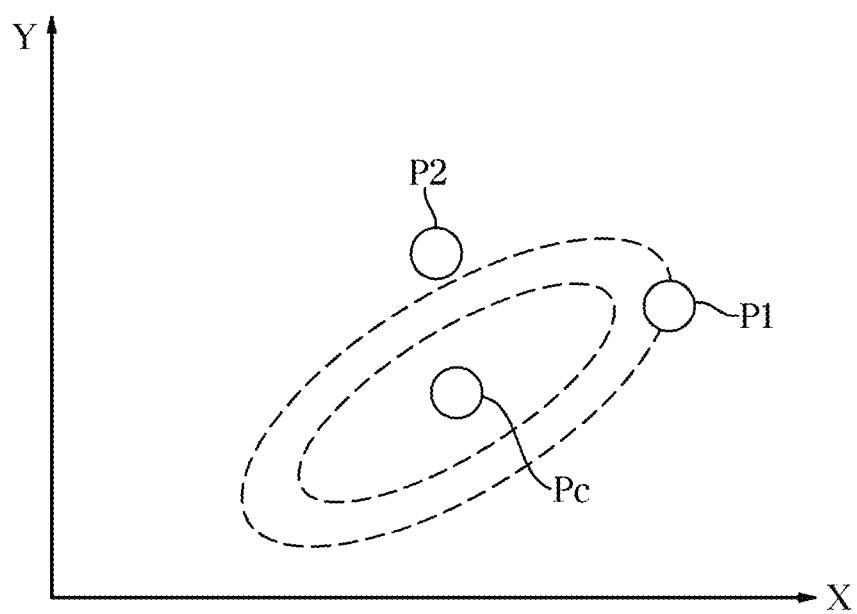
FIG. 9 shows an exemplary embodiment of a Mahalanobis distance which is a distance in which one predicted position P1 or P2 in one distribution deviates from a center Pc.

Referring to FIG. 9, the Mahalanobis distance may be a distance in which one predicted position P1 or P2 in one distribution deviates from a center Pc, and may be expressed by the following equation.

Here, $\Sigma$ may refer to ovariance, and have higher similarity as a value of distance approaches 0.

The fusion device 233 may obtain the covariance based on the driving speed information and the yaw rate information of the vehicle 1 whenever the position is predicted through the extended Kalman filter and probably obtain a drivable range of the vehicle 1.

$$Dis_{maha}(t) = [x_{GPS}(t) - x_{dead}(t) y_{GPS}(t) - y_{dead}(t) \psi_{dead} - \psi_{dead}] \cdot \Sigma_{SKF}^{-1}$$

$$[x_{GPS}(t) - x_{dead}(t) y_{GPS}(t) - y_{dead}(t) \psi_{dead} - \psi_{dead}]^T$$

$\alpha$ may be a value for an outlier reference distance.

When it is $[0 \leq Dis_{maha}(t) \leq \alpha \ (\alpha > 1)]$, the fusion device 233 may be determined as the reliability information, and when it is not $[0 \leq Dis_{maha}(t) \geq \alpha \ (\alpha > 1)]$, the fusion device 233 may be determined as the outlier information.

That is, when the value of the Mahalanobis distance is greater than a reference distance, the fusion device 233 may determine that the probability of driving of the vehicle 1 is lower than a reference probability, and determine that it is the outlier information.

The fusion device 233 may filter the outlier information based on the Euclidean distance and filter the outlier information based on the Mahalanobis distance.

The fusion device 233 may fuse the dead reckoning information and the position information received by the position receiver 210 using the Extended Kalman Filter and recognize the position of the vehicle 1 based on the fused information.

Figure 10:
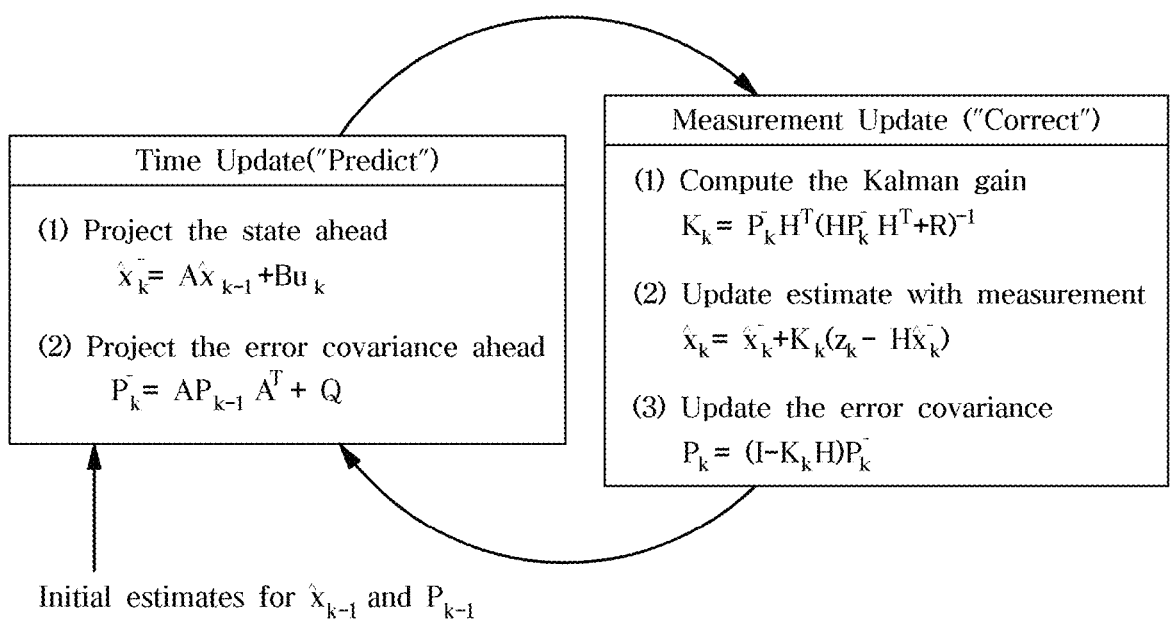
FIG. 10 shows an exemplary embodiment that an extended Kalman filter is a Kalman filter used by converting a nonlinear system into a linear system using Jacobian.

Referring to FIG. 10, the extended Kalman filter may be a Kalman filter used by converting a nonlinear system into a linear system using Jacobian, which remove noise and predict the position information that is not received by the position receiver 210 through the system model. Here, the Kalman filter may be an algorithm developed for the linear systems.

That is, the Extended Kalman Filter may convert the nonlinear system into the linear system using Jacobian in order to use the Kalman filter in the nonlinear system.

$$A \equiv \frac{\partial f}{\partial x}\bigg|_{\hat{x}_k}, H \equiv \frac{\partial h}{\partial x}\bigg|_{\hat{x}_k}$$

The fusion device 233 may predict the position based on the driving speed information of the vehicle 1 and the yaw rate information of the vehicle 1 using the system model of the extended Kalman filter, and repeat a process of correcting the predicted position using the position information received by the position receiver 210.

The position recognizer 234 may recognize the position of the vehicle 1 by repeating the process of correcting the predicted position using the position information received by the position receiver 210.

When a precision map (HD map) information or a Light Detection And Ranging (LiDAR) sensor or a radar sensor is provided, the position recognizer 234 may correct the recognized position information based on the HD map information and the position information recognized by the fusion device 233, and may also correct the recognized position information based on the information detected by the LiDAR sensor or the radar sensor and the position information recognized by the fusion device 233.

When the position is recognized, the second controller 230 may determine whether it is a speed limit, a stopper, a child protection zone, a danger zone, or a construction zone based on the position information and the map information for the recognized position, and may also control the sound outputter 260 to output a warning sound or a guide sound based on the determination result.

When it is possible to communicate with a server, an infrastructure, and other vehicles, the second controller 230 may also correct the recognized position information based on the position information provided by the server, the infrastructure, and other vehicles.

The second controller 230 may generate navigation information by matching the position information for the recognized position to the map information when the position is recognized, and may provide the generated navigation information to the user interface 250.

The second controller 230 may generate navigation information based on the position information and the map information for the recognized position of the vehicle 1, and may control at least one of a navigation mode, a driving guidance mode, a navigation-based smart cruise control mode, and the autonomous driving mode based on the navigation information.

The second controller 230 may generate the navigation information based on the position information and the map information for the recognized position of the vehicle 1, and may output the navigation information to at least one of the user interface 250, the sound outputter 260, and the autonomous driver 270 to control at least one of the navigation mode, the driving guidance mode, the navigation-based smart cruise control mode, and the autonomous driving mode based on the navigation information.

When performing the navigation mode, the second controller 230 may perform signal processing on the received navigation information when the navigation information is received, and may control the output of image information and sound information generated by the signal processing.

That is, the second control unit 230 may decode the received navigation information to separate the navigation information into the image information and the sound information, perform rendering of the separated image information, control the rendered image information to be transmitted to the user interface 250, and control the separated sound information to be transmitted to the sound outputter 260.

Here, the image information among the received navigation information may include the map information to which the recognized position information is matched.

The second controller 230 may generate a path from the current position to the destination based on the received destination information and the current position information when information of the destination is received through an inputter 251 in the navigation mode or the autonomous driving mode, and may control the output of road guidance information based on path information for the generated path.

Here, the path information may include map information matching the path from the current position to the destination.

In addition, the second controller 230 may decode the path information and transmit the decoded path information to a display 252 of the user interface 250, perform rendering of the decoded path information, and transmit the rendered path information to the display 252.

The second controller 230 may transmit the path information and the position information to the autonomous driver 270 to control autonomous driving based on the path information.

The second controller 230 may be implemented with a memory storing an algorithm to control operation of the components in the position recognition apparatus or data about a program that implements the algorithm, and a processor carrying out the aforementioned operation using the data stored in the memory.

The memory and the processor may be implemented in separate chips.

Alternatively, the memory and the processor may be implemented in a single chip.

The storage 230a may also store the navigation information, the map information, and the path information.

The storage 230a may also store destination information input by a user.

The storage 230a may store information about the limit distance, and store information about the detection error of the wheel speed sensor, the IMU, and a signal reception error of the GPS receiver.

The storage 230a may include a nonvolatile memory device, such as a cache, a read only memory (ROM), a programmable ROM (PROM), an erasable programmable ROM (EPROM), an electrically erasable programmable ROM (EEPROM), and a flash memory, a volatile memory device, such as a random access memory (RAM), or other storage media, such as a hard disk drive (HDD), a CD-ROM, and the like, but the implementation of the storage 241 is not limited thereto.

The storage 230a may be a memory implemented as a chip separated from the processor, which will be described below in connection with the second controller 230, or may be implemented as a single chip integrated with the processor.

The communicator 240 may include can communication, Wi-Fi communication, Bluetooth communication, and USB communication.

The communicator 240 may transmit and receive information between the position receiver 210, the detector 220, and the second controller 230. The communicator 240 may transmit and receive information between the second controller 230, the user interface 250, the sound outputter 260, and the autonomous driver 270.

That is, the communicator 240 may transmit the position information of the position receiver 210 and the dynamic information of the vehicle 1 of the detector 220 to the second controller 230, and transmit the position information recognized by the second controller 230 to the autonomous driver 270, the sound outputter 260, and the user interface 250.

The user interface 250 may receive user input and display information about a function in operation, information corresponding to the user input, and the like.

The user interface 250 may include the inputter 251 and the display 252.

The inputter 251 may receive an operation on/off command for at least one function, receive at least one function among a plurality of functions, and receive the destination information when selecting the autonomous driving mode or the navigation mode.

The inputter 251 may also receive information about a target driving speed in the autonomous driving mode.

The inputter 251 may be implemented as at least one of physical buttons, keys, switches, and levers. The inputter 120 may also be implemented as a jog dial or a touch pad for inputting a movement command and a selection command of a cursor displayed on a vehicle terminal AVN.

That is, the inputter 251 may input the movement command and the selection command of the cursor displayed on the display 252 using the jog dial or the touch pad.

The inputter 251 may transmit an operation signal of the button or the operation signal of the jog dial to the second controller 230, and also transmit a touch signal touched on the touch pad to the second controller 230.

The display 252 may display an image or turn on or turn off a light in response to a control command of the second controller 240.

The display 252 may display an image of the road, or display the road guidance information and the map information.

The display 252 may display a top view image of the vehicle 1.

The display 252 may display information related to the driving mode such as the autonomous driving mode or the manual driving mode.

The display 252 may also display obstacles obtained by the image obtainer 210 in addition to the lane.

The display 252 may display the image information of the navigation information.

The display 252 may display an icon with a guide and command information.

In addition, the display 252 may display a Korean/English character button for inputting the destination, a numeric button, a special character button, and the like, and may display a path guidance button for a path guidance command.

The display 252 may display information related to a telephone call, display the image of content, display information related to music playback, or display an external broadcast signal as the image.

The display 252 may be provided as a cathode ray tube (CRT), a digital light processing (DLP) panel, a plasma display panel, a liquid crystal display (LCD) panel, an electro luminescence (EL) panel, an electrotrophic display (EPD) panel, an electrochromic display (ECD) panel, a light emitting diode (LED) panel or an organic light emitting diode (OLED) panel, but is not limited thereto.

When configured as a touch screen panel (TSP) forming a mutual layer structure with the touch pad, the display 252 may also be used as the inputter 251.

For example, the inputter 251 may be implemented as a touch panel, and the display 252 may be implemented as a flat panel display panel such as LCD, PDP, OLED. That is, the inputter 251 and display 252 of the user interface 250 may be implemented as a touch screen in which the touch panel and the flat panel display panel are integrally formed.

The user interface 250 of the embodiment may receive the image information and the sound information of the navigation information and the path information decoded and rendered by the second controller 230, but may receive and provide the navigation information and the path information, and directly decode and render the provided navigation information and path information.

The sound outputter 260 outputs sound in response to a control command of the second controller 230.

The sound outputter 260 may output a warning sound for notifying the presence of an obstacle that crosses at least one of the two lane lines of the subject lane.

The sound outputter 260 may output a warning sound for preventing collision with the obstacle. The sound outputter 260 may be a speaker.

The sound outputter 260 may output the sound information of the navigation information, but amplify and output a sound signal in the received sound information by a predetermined size.

That is, the sound outputter 260 may also output the path and the driving information as sound in the autonomous driving mode or the navigation mode, output the sound information of content or external broadcast, or output the sound information such as music and radio selected by the user.

The sound outputter 260 may guide the speed limit, the stopper, and the child protection zone with sound.

The autonomous driver 270 may perform autonomous driving to the destination based on the current position of the vehicle 1, the map information, and the path information.

At least one component may be added or deleted corresponding to the performance of the components of the vehicle 1 illustrated in FIGS. 4 and 5. It will be readily understood by those skilled in the art that the mutual position of the components may be changed corresponding to the performance or structure of the vehicle 1.

In the meantime, each of the components illustrated in FIGS. 4 and 5 may be referred to as a hardware component such as software and/or a field programmable gate array (FPGA) and an application specific integrated circuit (ASIC).

Figure 11:
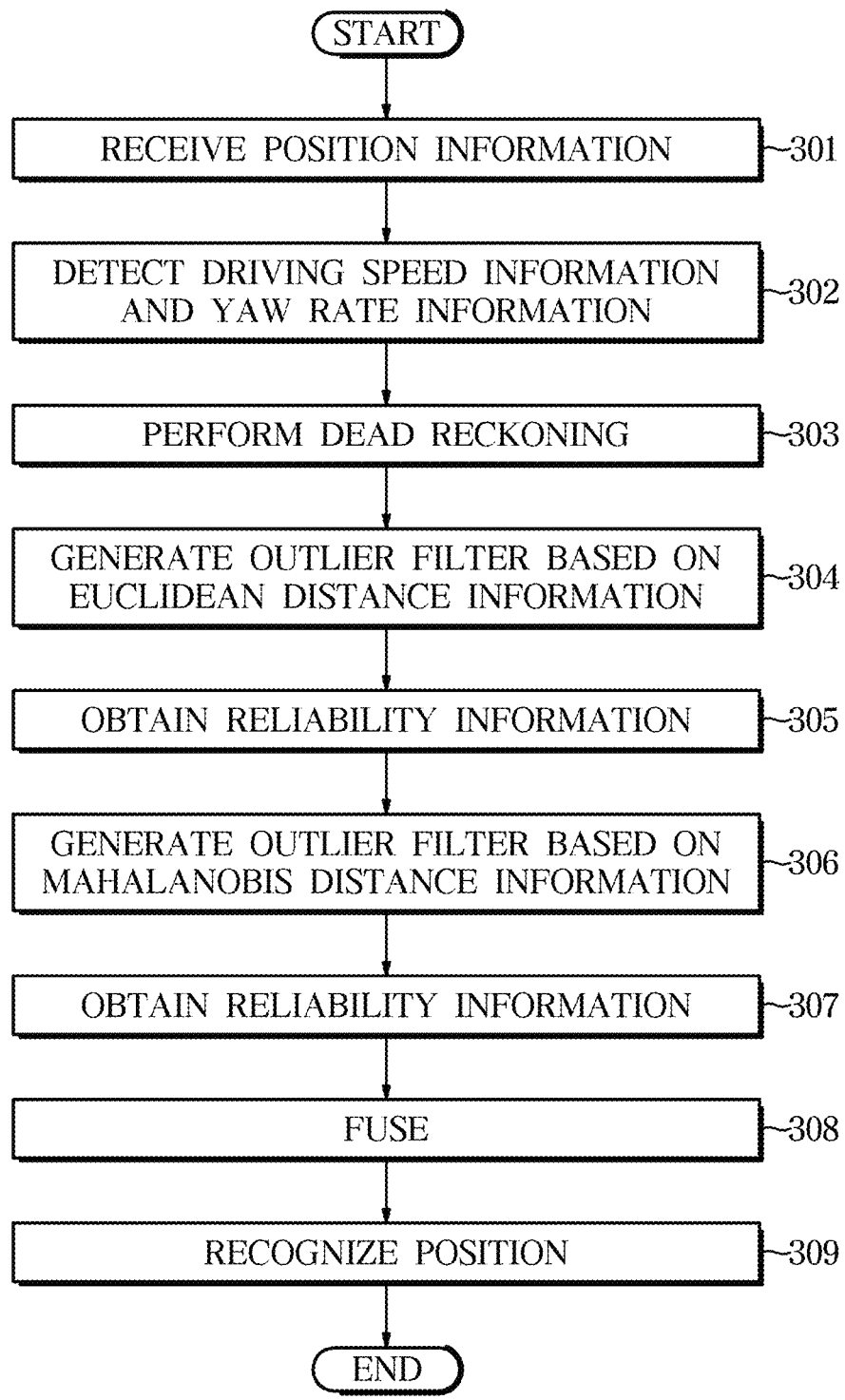
FIG. 11 is a control flowchart of a position recognition apparatus provided in a vehicle according to an embodiment.

FIG. 11 is a control flowchart of a position recognition apparatus provided in a vehicle according to an embodiment.

The position recognition apparatus of the vehicle 1 may operate the position receiver 210 to receive the position information from the position receiver 210 (301).

More particularly, the position recognition apparatus may obtain the longitude information and the latitude information about the position of the vehicle 1 from signals of the plurality of satellites, obtain the map information corresponding to the obtained longitude information and latitude information, and obtain the coordinate information for vertical and horizontal of the vehicle 1 based on the obtained road information in the map information.

Next, the position recognition apparatus may detect the dynamic information of the vehicle 1. Here, detecting the dynamics information may include detecting the speed information and the yaw rate information of the vehicle 1 (302).

Next, the position recognition apparatus may obtain the dead reckoning information by performing the dead reckoning based on the speed information and the yaw rate information of the vehicle 1 (303).

More particularly, the position recognition apparatus may obtain the information (i.e., trajectory information) about the driving trajectory of the vehicle 1 based on the speed information and the yaw rate information of the vehicle 1 detected by the detector 220, and may obtain the current position information based on the obtained trajectory information and the position information recognized in the previous cycle.

The dead recording information may include the obtained trajectory information, the position information recognized in the previous cycle, the current position information based on the obtained trajectory information and the position information recognized in the previous cycle.

Next, the position recognition apparatus may generate the outlier filter (which may be a first outlier filter) based on the Euclidean distance information (304), and may obtain only the reliability information using the generated outlier filter (305).

That is, when the obtained Euclidean distance is greater than the limit distance, the position recognition apparatus may determine that it is the outlier information (Outlier). When the obtained Euclidean distance is less than the limit distance, the position recognition apparatus may determine that it is the reliability information (Reliable).

In this case, the position recognition apparatus may not be used as information for position recognition when the position information received by the position receiver 210 is the outlier information, and may be used as information for position recognition when the position information received by the position receiver 210 is the reliability information.

In addition, the position recognition apparatus may determine whether the position information received by the position receiver 210 is the reliability information or the outlier information using the generated outlier filter.

Next, the position recognition apparatus may generate the outlier filter (which may be a second outlier filter) based on the Mahalanobis distance information (306), and may obtain only the reliability information using the generated outlier filter (307).

When the value of the Mahalanobis distance is greater than the reference distance, the position recognition apparatus may determine that the probability of driving of the vehicle 1 is lower than the reference probability, and may determine this is the outlier information.

In this case, the position recognition apparatus may not be used as information for position recognition when the position information received by the position receiver 210 is the outlier information, and may be used as information for position recognition when the position information received by the position receiver 210 is the reliability information.

In addition, the position recognition apparatus may determine whether the position information received by the position receiver 210 is the reliability information or the outlier information using the generated outlier filter.

Next, the position recognition apparatus may fuse the reliability information using the extended Kalman filter (308) and recognize the position of the vehicle 1 based on the fused information (309).

FIG. 12A illustrates position information (GPS) received by the position receiver 210, position information (Dead recknoning) by dead reckoning, and position information (EKF) by filtering of the extended Kalman filter when filtering is not performed by the first and second outlier filters.

FIG. 12B illustrates the position information (GPS) received by the position receiver 210, the position information (Dead recknoning) by dead reckoning, and the position information (EKF) by filtering of the extended Kalman filter when filtering is performed by the first and second outlier filters.

As illustrated in FIGS. 12A and 12B, when the position information is obtained by the outlier filtering and the extended Kalman filtering, it can be seen that an accuracy of position recognition is higher.

When there are several paths moving from one point to another, the accuracy of position recognition may be further improved by obtaining the position information by the outlier filtering and the extended Kalman filtering.

FIG. 13A illustrates the position information when and when filtering by the first and second outlier filters is not performed. As illustrated in FIG. 13A, when the position information is obtained by the outlier filtering, it can be seen that the the accuracy of position recognition is higher.

FIG. 13B illustrates the position information (EKF) and the position information (GPS) received by the position receiver 210 when filtering by the first and second outlier filters and filtering by the extended Kalman filter are performed.

As illustrated in FIG. 13B, when the position information is obtained by the outlier filtering and the extended Kalman filtering, it can be seen that the accuracy of position recognition is higher.

Next, the position recognition apparatus may transmit information about the recognized position to the user interface 250, the sound outputter 260, and the autonomous driver 270, and may also perform the navigation-based smart cruise control based on the information about the recognized position.

When the position information recognized by the position recognition apparatus is received, the vehicle 1 may extract a range of map information including the received position information, match the corrected position information with the extracted map information, generate the navigation information, encode the generated navigation information, and display it through the user interface 250.

Here, encoding the navigation information may include encoding sound information guiding traffic information and road environment information of the position having corrected position information together.

In addition, the vehicle 1 may transmit the rendered image information to the display 252 of the user interface 250, and transmit the separated sound information to the sound outputter 260.

Next, the user interface 250 provided in the vehicle 1 may output the received navigation information. That is, the user interface 250 may display the image information of the navigation information on the display 252, and may provide the road guidance information to the user by outputting the sound information of the navigation information to the sound outputter 260.

According to the embodiments of the disclosure, the disclosure can solve a problem of position misrecognition by receiving the radio waves reflected in buildings or obstacles around the GPS receiver in a downtown area by recognizing the position of the vehicle using the dynamic information of the vehicle.

The disclosure may more accurately recognize the position of the vehicle even when using a relatively low cost GPS. Through this, it is possible to promote the popularization of the advanced driver assistance system (ADAS) and autonomous driving technology.

The disclosure can improve the performance and accuracy of functions of various position-based applications, such as a navigation function or autonomous driving function that guides the path using the position information of the vehicle. That is, the disclosure can improve the performance of a convenience function using position information such as a navigation device.

The disclosure can reduce the number of path re-navigation due to position misrecognition when performing the navigation function.

The disclosure can reduce the possibility of erroneous control of speed due to position misrecognition when in a navigation-based smart cruise control (NSCC) mode.

As described above, the disclosure can improve the quality and productability of the vehicle having the advanced driver assistance system and the advanced driver assistance system, and further increase user satisfaction and secure product competitiveness.

The disclosed embodiments may be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a computer-readable recording medium.

The non-transitory computer-readable recording medium may include all kinds of recording media storing commands that can be interpreted by a computer. For example, the non-transitory computer-readable recording medium may be, for example, ROM, RAM, a magnetic tape, a magnetic disc, flash memory, an optical data storage device, etc.

Embodiments of the disclosure have thus far been described with reference to the accompanying drawings. It should be obvious to a person of ordinary skill in the art that the disclosure may be practiced in other forms than the embodiments as described above without changing the technical idea or essential features of the disclosure. The above embodiments are only by way of example, and should not be interpreted in a limited sense.

What is claimed is:

1. An advanced driver assistance system comprising:
    a position receiver configured to receive signals from a plurality of satellites;
    a communicator configured to receive dynamics information of a vehicle; and
    a controller configured to
        obtain position information based on the signals received at the position receiver,
        obtain dead reckoning information based on the received dynamic information,
        recognize a position of the vehicle based on the obtained dead reckoning information and the obtained position information,
        obtain a value of Euclidean distance based on the position information about the position of the vehicle recognized in a previous cycle and the obtained position information,
        when the obtained value of the Euclidean distance is greater than a value of a limit distance, determine the position information corresponding to the obtained value of the Euclidean distance as outlier information, and when the obtained value of the Euclidean distance is less than or equal to the value of the limit distance, determine the position information corresponding to the obtained value of the Euclidean distance as reliability information.

2. The advanced driver assistance system according to claim 1, wherein the controller is configured to:
predict the position information corresponding to the obtained dead reckoning information;
obtain a value of Mahalanobis distance based on the obtained position information and the predicted position information; and
determine outlier information based on the value of Euclidean distance and the value of the Mahalanobis distance.

3. The advanced driver assistance system according to claim 2, further comprising:
a storage configured to store a detection error of a detector and a signal reception error of the position receiver,
wherein the controller is configured to:
set an outlier range based on the Euclidean distance, the limit distance, the stored detection error of the detector, and the stored signal reception error of the position receiver; and
determine whether the position information corresponding to the obtained value of the Euclidean distance is reliability information based on the set outlier range.

4. The advanced driver assistance system according to claim 2, wherein the controller is configured to:
when the value of the Mahalanobis distance is greater than a value of a reference distance, determine the position information corresponding to the value of the Mahalanobis distance as outlier information; and
when the value of the Mahalanobis distance is less than or equal to the value of the reference distance, determine the position information corresponding to the value of the Mahalanobis distance as reliability information.

5. The advanced driver assistance system according to claim 2, wherein the controller is configured to:
when recognizing the position of the vehicle, predict the position information based on at least one of the position information about the position of the vehicle recognized in the previous cycle, the obtained dead reckoning information, and the obtained position information;
generate an outlier filter based on the obtained dead reckoning information and the obtained position information; and
recognize the position of the vehicle using information passing through the generated outlier filter among the predicted position information.

6. The advanced driver assistance system according to claim 1, further comprising:
a storage configured to store a detection error of a detector and a signal reception error of the position receiver,
wherein the controller is configured to set an outlier range based on the position information corresponding to the obtained dead reckoning information, the position information on the position of the vehicle recognized in a previous cycle, the stored detection error of the detector, and the stored signal reception error of the position receiver.

7. The advanced driver assistance system according to claim 6, wherein the dynamics information comprises driving speed information of the vehicle and yaw rate information of the vehicle, and
wherein the controller is configured to perform dead recording based on the driving speed information and the yaw rate information.

8. The advanced driver assistance system according to claim 7, wherein the controller is configured to:
predict the position information based on at least one of the position information about the position of the vehicle recognized in the previous cycle, the obtained dead reckoning information, and the obtained position information; and
when the predicted position information is within the outlier range, perform an update of an extended Kalman filter based on the position information obtained by the dead recording and the position information obtained by the position receiver.

9. The advanced driver assistance system according to claim 7, wherein the controller is configured to:
predict the position information based on at least one of the position information about the position of the vehicle recognized in the previous cycle, the obtained dead reckoning information, and the obtained position information; and
when the predicted position information is outside the outlier range, perform an update of an extended Kalman filter based on the position information obtained by the dead recording.

10. A vehicle comprising:
a position receiver configured to receive signals from a plurality of satellites;
a detector configured to detect a driving speed and yaw rate, and to output detection information corresponding to the detected driving speed and yaw rate;
a controller configured to
obtain position information based on the signal received at the position receiver,
obtain dead reckoning information based on position information about a position of a vehicle recognized in a previous cycle and the received detection information,
predict the position information based on the obtained dead reckoning information,
generate an outlier filter based on the predicted position information and the obtained position information, and
recognize a current position using information passing through the generated the outlier filter among the predicted position information and the obtained position information; and
a display configured to output information about the recognized current position,
wherein the controller is further configured to:
when generating the outlier filter, obtain a value of Euclidean distance based on the position information about the position of the vehicle recognized in a previous cycle and the obtained position information, and to generate the outlier filter based on the value of the Euclidean distance, and
determine the position information such that the value of the Euclidean distance is less than or equal to a value of a limit distance using the generated outlier filter among the position information corresponding to the value of the Euclidean distance.

11. The vehicle according to claim 10, wherein, when generating the outlier filter, the controller is configured to obtain a value of Mahalanobis distance based on the predicted position information and the obtained position information, and to generate the outlier filter based on the value of the Mahalanobis distance.

12. The vehicle according to claim 11, wherein the controller is configured to determine the position information such that the value of the Mahalanobis distance is less than or equal to a value of a reference distance using the generated outlier filter among the position information corresponding to the value of the Mahalanobis distance.

13. The vehicle according to claim 10, wherein the controller is configured to update information passing through the generated outlier filter using an extended Kalman filter.

14. A method of controlling a vehicle comprising:
receiving signals from a plurality of satellites;
obtaining position information based on the received signal;
detecting a driving speed and yaw rate;
obtaining dead reckoning information based on position information about a position of a vehicle recognized in a previous cycle and the received detection information;
predicting the position information based on the obtained dead reckoning information;
obtaining a value of Euclidean distance based on the position information about the position of the vehicle recognized in the previous cycle and the obtained position information;
generating a first outlier filter based on the value of the Euclidean distance;
obtaining a value of Mahalanobis distance based on the obtained position information and the predicted position information;
generating a second outlier filter based on the value of the Mahalanobis distance;
recognizing a current position of the vehicle by fusing information passing through the first outlier filter and information passing through the second outlier filter; and
outputting information about the current position of the recognized vehicle as an image or a sound.

15. The method according to claim 14, wherein the recognizing of the current position of the vehicle comprises:
updating the obtained position information using an extended Kalman filter.

* * * * *